United States Patent
Ouwenga et al.

(10) Patent No.: US 9,982,673 B2
(45) Date of Patent: May 29, 2018

(54) SUPERCHARGER HAVING INTEGRATED CLUTCH AND TORSIONAL DAMPER

(71) Applicant: Eaton Corporation, Cleveland, OH (US)

(72) Inventors: Daniel Robert Ouwenga, Portage, MI (US); William Bruce Witherspoon, Lansing, MI (US)

(73) Assignee: Eaton Corporation, Cleveland, OH (US)

( * ) Notice: Subject to any disclaimer, the term of this patent is extended or adjusted under 35 U.S.C. 154(b) by 106 days.

(21) Appl. No.: 15/094,041

(22) Filed: Apr. 8, 2016

(65) Prior Publication Data
US 2016/0222966 A1 Aug. 4, 2016

Related U.S. Application Data

(63) Continuation of application No. PCT/US2014/055134, filed on Sep. 11, 2014.
(Continued)

(51) Int. Cl.
*F02B 33/00* (2006.01)
*F04C 13/00* (2006.01)
(Continued)

(52) U.S. Cl.
CPC ............ *F04C 29/005* (2013.01); *F02B 33/34* (2013.01); *F02B 33/38* (2013.01); *F02B 39/04* (2013.01);
(Continued)

(58) Field of Classification Search
CPC ...... F04C 29/005; F04C 18/126; F02B 33/34; F02B 33/38; F02B 39/04; F02B 39/12; F16F 15/124
(Continued)

(56) References Cited

U.S. PATENT DOCUMENTS 3,241,396 A * 3/1966 Magrum ................. F16F 1/362
464/81
5,893,355 A 4/1999 Glover et al.
(Continued)

FOREIGN PATENT DOCUMENTS

EP 0344945 A2 12/1989
JP H01280636 A 11/1989
(Continued)

OTHER PUBLICATIONS

International Search Report and Written Opinion for International Application No. PCT/US2014/055134 dated Dec. 15, 2014, 12 pages.

*Primary Examiner* — Thai Ba Trieu
(74) *Attorney, Agent, or Firm* — RMCK Law Group PLC

(57) ABSTRACT

A supercharger constructed in accordance to one example of the present disclosure can include a first shaft portion, a coupling assembly, a clutch rotor and a clutch armature. The first shaft portion can be connected to a pulley. The coupling assembly can couple the first shaft portion to a second shaft portion. The first and second shaft portions can be configured to rotate around a common longitudinal axis. The coupling assembly can be configured to provide torsional damping between the first and second shaft portions. The clutch rotor can be mounted to the second shaft portion. The clutch armature can be mounted to a drive shaft and be unconnected to the first and second shaft portion. The clutch rotor and the clutch armature can selectively cooperate in an engaged position and a disengaged position. In the engaged position, the clutch rotor and the clutch armature rotate together.

18 Claims, 8 Drawing Sheets

Related U.S. Application Data

(60) Provisional application No. 61/889,606, filed on Oct. 11, 2013.

(51) Int. Cl.
    *F04C 29/00* (2006.01)
    *F02B 33/34* (2006.01)
    *F02B 33/38* (2006.01)
    *F02B 39/04* (2006.01)
    *F02B 39/12* (2006.01)
    *F04C 18/12* (2006.01)
    *F16F 15/124* (2006.01)

(52) U.S. Cl.
    CPC ............ *F02B 39/12* (2013.01); *F04C 18/126* (2013.01); *F16F 15/124* (2013.01)

(58) Field of Classification Search
    USPC ................ 123/559.1–559.3, 561; 192/84.96, 192/84.961, 18 R, 12 D; 417/319; 418/181; 475/258
    See application file for complete search history.

(56) References Cited

U.S. PATENT DOCUMENTS

| | | | |
|---|---|---|---|
| 6,331,103 B1 | 12/2001 | Teraoka | |
| 7,621,263 B2 * | 11/2009 | Eybergen | F02B 33/40 123/559.1 |
| 7,681,559 B2 * | 3/2010 | Pratley | F02B 39/12 123/559.1 |
| 8,042,526 B2 * | 10/2011 | Suhocki | F04C 29/005 123/559.1 |
| 8,464,697 B2 * | 6/2013 | Ouwenga | F02B 33/38 123/559.3 |
| 8,668,614 B2 * | 3/2014 | Sherrill | F02D 41/0007 475/183 |
| D781,345 S * | 3/2017 | Pratley | D15/5 |
| 2008/0276756 A1 * | 11/2008 | Marumoto | F16H 13/06 74/721 |
| 2013/0160749 A1 * | 6/2013 | Creager | F02B 39/12 123/559.3 |
| 2014/0017101 A1 * | 1/2014 | Staley | F02B 39/12 192/69.71 |
| 2014/0334959 A1 * | 11/2014 | Franke | F04C 18/16 192/71 |
| 2015/0260188 A1 * | 9/2015 | Witherspoon | F04C 18/126 418/1 |
| 2016/0237885 A1 * | 8/2016 | Fortini | F04C 29/005 |

FOREIGN PATENT DOCUMENTS

| | | |
|---|---|---|
| WO | 2008081284 A1 | 7/2008 |
| WO | 2012020304 A1 | 2/2012 |

\* cited by examiner

SUPERCHARGER HAVING INTEGRATED CLUTCH AND TORSIONAL DAMPER

CROSS-REFERENCE TO RELATED APPLICATIONS

This application is a continuation of International Application No. PCT/US2014/055134 filed on Sep. 11, 2014, which claims the benefit of U.S. Patent Application No. 61/889,606 filed on Oct. 11, 2013. The disclosure of the above application is incorporated herein by reference.

FIELD

The present disclosure relates generally to superchargers and more particularly to a clutched supercharger having a torsional damper between first and second shaft portions.

BACKGROUND

Rotary blowers of the type to which the present disclosure relates are referred to as "superchargers" because they effectively super charge the intake of the engine. One supercharger configuration is generally referred to as a Roots-type blower that transfers volumes of air from an inlet port to an outlet port. A Roots-type blower includes a pair of rotors which must be timed in relationship to each other, and therefore, are driven by meshed timing gears which are potentially subject to conditions such as gear rattle and bounce. Typically, a pulley and belt arrangement for a Roots blower supercharger is sized such that, at any given engine speed, the amount of air being transferred into the intake manifold is greater than the instantaneous displacement of the engine, thus increasing the air pressure within the intake manifold and increasing the power density of the engine. A conventional supercharger is generally mechanically driven by the engine, and therefore, may represent a drain on engine horsepower whenever engine "boost" may not be required and/or desired.

In some examples, superchargers such as the Roots-type blower can create unwanted noise. For example, Roots-type blower noise may be classified as either of two types. The first is solid borne noise caused by rotation of timing gears and rotor shaft bearings subjected to fluctuating loads (the firing pulses of the engine), and the second is fluid borne noise caused by fluid flow characteristics, such as rapid changes in fluid (air) velocity. The present disclosure is primarily directed toward the solid borne noise. More particularly the present disclosure can minimize the "bounce" of the timing gears during times of relatively low speed operation, when the blower rotors are not "under load". In this regard, it is important to isolate the fluctuating input to the supercharger from the timing gears. In other examples it is desirable to account for misalignment and/or runout between the input shaft and rotor shaft.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A supercharger constructed in accordance to one example of the present disclosure can include a first shaft portion, a coupling assembly, a clutch rotor and a clutch armature. The first shaft portion can be connected to a pulley. The coupling assembly can couple the first shaft portion to a second shaft portion. The first and second shaft portions can be configured to rotate around a common longitudinal axis. The coupling assembly can be configured to provide torsional damping between the first and second shaft portions. The clutch rotor can be mounted to the second shaft portion. The clutch rotor can rotate around the longitudinal axis. The clutch armature can be mounted to a drive shaft and be unconnected to the first and second shaft portion. The clutch armature can be configure to rotate around the longitudinal axis. The clutch rotor and the clutch armature can selectively cooperate in an engaged position and a disengaged position. In the engaged position, the clutch rotor and the clutch armature rotate together.

According to additional features, the supercharger can further comprise a clutch coil spaced along the longitudinal axis from the pulley. The clutch rotor can be magnetized by the clutch coil. The supercharger can further comprise a clutch housing. The clutch coil can be mounted in the clutch rotor and be disposed between the clutch housing and the clutch rotor in a direction along the longitudinal axis.

In other features, the coupling assembly can include a first hub, a second hub, a first coupling and a first elastomeric bushing. The first hub can have a plurality of first hub pins extending therefrom. The first hub can be mounted for concurrent rotation with the first shaft portion. The second hub can be mounted for concurrent rotation with the second shaft portion. The first coupling can be disposed intermediate the first and second hubs. The first coupling can define a plurality of first coupling bores that receive the first hub pins. The first elastomeric bushing can be mounted around one of the first hub pins and be received by one of the first coupling bores. The first elastomeric bushing can provide dampening between the first hub and the first coupling.

According to other features, the coupling assembly can further include a plurality of first elastomeric bushings. A first elastomeric bushing can be mounted around each of the first hub pins. The second hub can include a plurality of second hub pins extending therefrom. The coupling assembly can further include a plurality of second elastomeric bushings. A second elastomeric bushing can be mounted around each of the second hub pins. A second coupling can be disposed intermediate the first and second hubs. The second coupling can define a plurality of second coupling bores that receive the second hub pins. A center hub can have a plurality of first center hub pins and a plurality of second center hub pins extending therefrom. Each of the first center hub pins can be arranged coaxially to a corresponding second center hub pin.

In other features, the coupling assembly can include a plurality of third elastomeric bushings. A third elastomeric bushing can be mounted around each of the first center hub pins and the second center hub pins. The second coupling can define a plurality of third coupling bores that receive the second center hub pins. A plurality of sleeves can be disposed between corresponding plurality of first hub pins and first elastomeric bushings. Each sleeve of the plurality of sleeves can comprise a central body portion and a flange. The central body portion can define a central passage configured to receive a corresponding first hub pin of the plurality of hub pins.

BRIEF DESCRIPTION OF THE DRAWINGS

The present disclosure will become more fully understood from the detailed description and the accompanying drawings, wherein.

DETAILED DESCRIPTION

Figure 1:
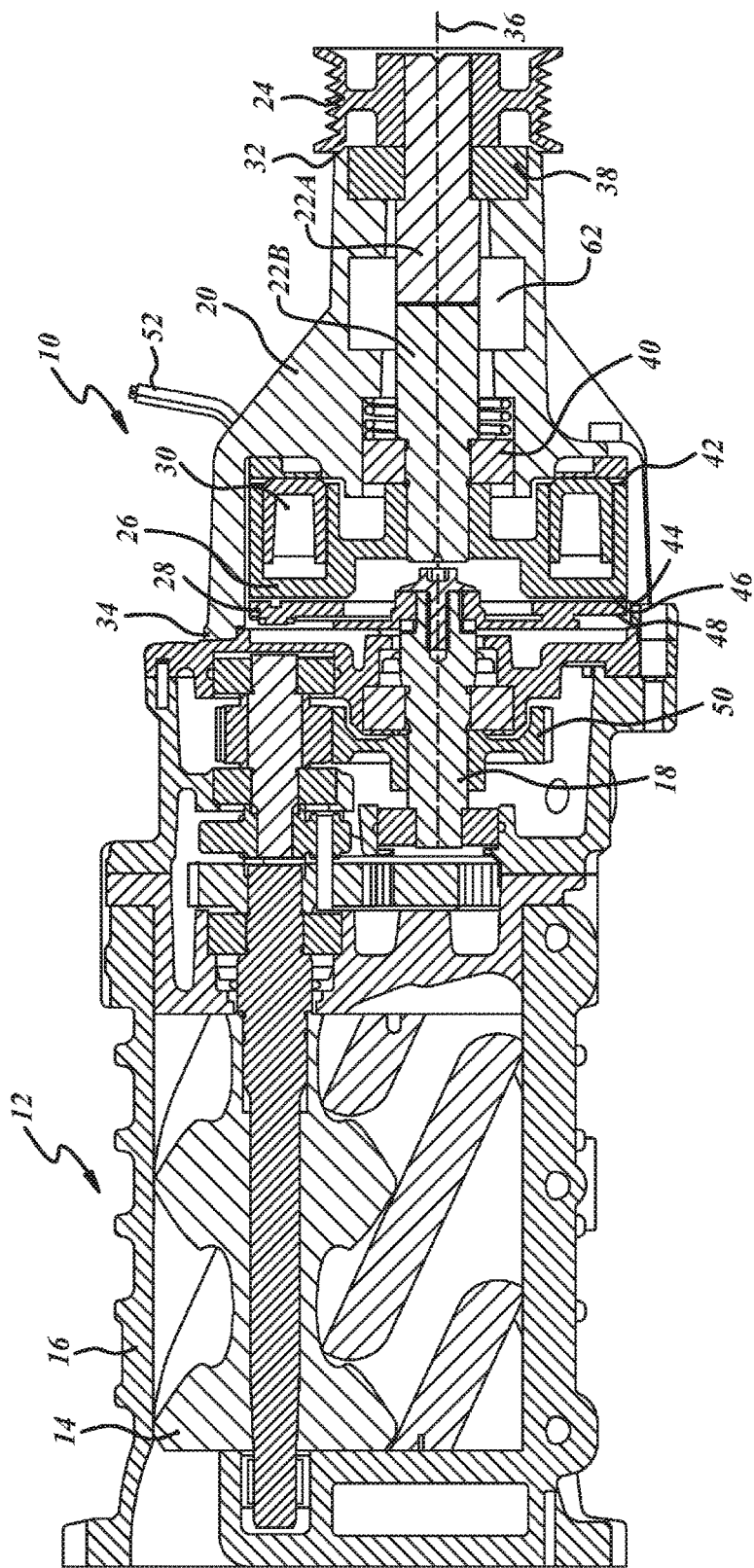
FIG. 1 is a cross-sectional view of a clutch assembly constructed in accordance to one example of the present disclosure and incorporated on an exemplary supercharger.
Figure 2:
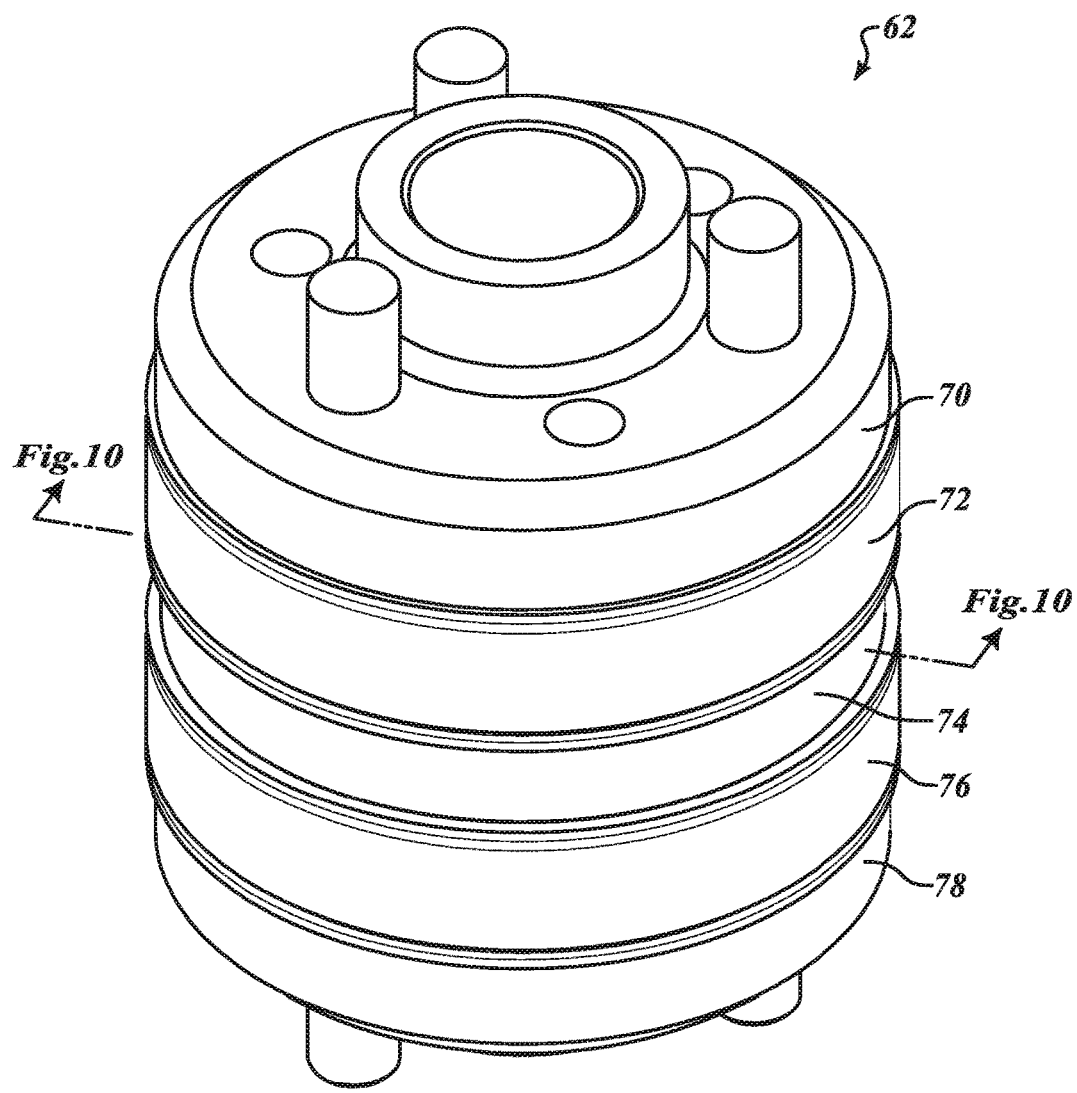
FIG. 2 is front perspective view of a coupling assembly used to couple an input shaft and a rotor shaft of the supercharger of FIG. 1 and constructed in accordance to one example of the present disclosure.

With initial reference to FIG. 1, a clutch assembly constructed in accordance to one example of the present disclosure is shown and generally identified at reference numeral 10. The clutch assembly 10 is configured for use with a supercharger 12 in accordance with one example of the present disclosure. The supercharger 12 may be part of an intake manifold assembly for an engine (not shown). The engine may include a plurality of cylinders and a reciprocating piston disposed within each cylinder, thereby defining an expandable combustion chamber. The engine may include intake and exhaust manifold assemblies for directing combustion fluid to and from the combustion chamber by way of intake and exhaust valves, respectively.

The supercharger 12 of the intake manifold may be any positive displacement pump, including the Roots type blower supercharger illustrated and described in U.S. Pat. Nos. 5,078,583 and 5,893,355 which are owned by the assignee of the present invention and which are hereby incorporated by reference in their entirety, but are not necessarily limited thereto. The supercharger 12 may also comprise a screw compressor or any other type of positive displacement pump. In accordance with an embodiment of the invention, the supercharger 12 may include a pair of rotors 14, each having a plurality of meshed lobes. The rotors may be disposed in a plurality of parallel, transversely overlapping cylindrical chambers and may be driven by engine crankshaft torque transmitted thereto in a known manner such as a drive belt. The supercharger 12 may include a main housing 16 that may define the plurality of cylindrical chambers. The mechanical drive of the supercharger 12, including a drive shaft 18, may rotate the rotors 14 at a fixed ratio, relative to the crankshaft speed, such that the displacement of the supercharger 12 is greater that the engine displacement, thereby boosting or supercharging the air flowing into the combustion chamber of the engine. The supercharger 12 may include an inlet port configured to receive fluid from an inlet duct or passage and an outlet port configured to direct the charged air to the intake valves via a discharge duct. The inlet duct or passage and the discharge duct may be interconnected by means of a bypass passage. A bypass valve may be disposed within the bypass passage and may be configured to be moved between an open position and a closed position by means of an actuator assembly.

The clutch assembly 10 includes a clutch housing 20, a first shaft portion 22A, a second shaft portion 22B, a pulley 24, a clutch rotor 26, a clutch armature 28, and a clutch coil 30. The clutch housing 20 may be configured to house other components of the clutch assembly 10. The clutch housing 20 may be smaller in diameter at a first end 32 and larger in diameter at a second end 34. The first end 32 may be proximate to the pulley 24. The second end 34 may be proximate to the main housing 16 of the supercharger 12.

The first and second shaft portions 22A and 22B can rotate about a common longitudinal axis 36. As will be described in greater detail herein, the first and second shaft portions 22A and 22B are coupled together by a torsional damper or coupling assembly 62. In the example shown, the first shaft portion 22A is supported by a bearing 38 and the second shaft portion 22B is supported by a bearing 40. Other configurations are contemplated. For example, both the first shaft portion 22A and the second shaft portion 22B can each be supported by two bearings.

The pulley 24 may be configured to transmit torque from the engine crankshaft (not shown) to the first shaft portion 22A and second shaft portion 22B through the coupling assembly 62 during engagement of the clutch assembly 10. In the example shown, the pulley 24 can be coupled to the first shaft portion 22A. In this regard, the pulley 24 can be disposed externally to the shaft 22A in accordance with one example of the present disclosure. The pulley 24 can be disposed at and end of the first shaft portion 22A and may circumferentially surround the first shaft portion 22A. The pulley 24 can be external to the clutch housing 20. In addition, the pulley 24 can be axially spaced along the longitudinal axis 36 from the clutch housing 20. The bearing 38 that is disposed between the clutch housing 20 and the first shaft portion 22A may be proximate to the pulley 22. The bearing 40 may be disposed between the clutch housing 20 and the second shaft portion 22B closer toward the main housing 16 of the supercharger 12. The pulley 24 may be separated from other components of the clutch assembly 10. For example the pulley 24 may be separated from the clutch armature 28.

The pulley 24 may have a diameter that is independent of the diameters of the clutch rotor 26, the clutch armature 28, and the clutch coil 30. The pulley 24, including its design and configuration, is independent of the torque capacity of the clutch rotor 26, the clutch armature 28, and the clutch coil 30. In accordance with a certain torque capacity of the supercharger 12, the pulley 24 may have a diameter that is less than about 85 mm in accordance with an example of the present disclosure. The pulley 24 may have a diameter that is between about 45 mm and about 85 mm in accordance with one example of the present disclosure. Based on the diameter of the pulley 24, the pulley 24 may conventionally be considered a small pulley. The pulley 24 may have a diameter that is smaller than the diameter of the clutch coil 30 in accordance with an example of the present disclosure, as the pulley 24 may not surround the clutch coil 30 in accordance to one configuration. The pulley 24 may also not be integrated with the clutch rotor 26 in accordance with an example of the present disclosure.

The clutch rotor 26 may be configured to be magnetized and set up a magnetic loop that attracts the clutch armature 28. The clutch rotor 26 may be connected to the second shaft portion 22B and or the pulley 24. The clutch rotor 26 may rotate around the longitudinal axis 36 of the shaft 22. The clutch rotor 26 is not connected to the drive shaft 18 of the supercharger as may be conventional in small pulley designs. The clutch rotor 26 may comprise steel in one configuration. The clutch rotor 26 can be formed of other materials. The clutch rotor 26 may rotate at rotational speeds that are at least the same as the pulley 24 and may rotate at rotational speeds greater than those capable by the clutch armature 28 in an example of the present disclosure. Because the clutch rotor 26 may be connected to the second shaft portion 22B and/or the pulley 24, the clutch rotor 26 may always maintain the same rotational speed as the pulley 24 in accordance to one configuration of the present disclosure. In this regard, the clutch rotor 26 may rotate at a rotational speed that is substantially the same as the rotational speed of the first and second input shafts 22A and 22B even with the clutch assembly 10 is disengaged. The clutch rotor 26 may generally be more stable at higher speeds than the clutch armature 28. The clutch rotor 26 may be disposed between the clutch armature 28 and the clutch coil 30 along the longitudinal axis 36. The clutch rotor 26 may have a first face 42 that is configured to at least partially surround the clutch coil 30. The clutch rotor 26 may have a second face 44 (i.e., opposing the first face 42) that is configured to face the clutch armature 28.

The clutch armature 28 can rotate around the longitudinal axis 36. The clutch armature 28 can be configured to be pulled against the clutch rotor 26 and apply a frictional force at contact. The load of the clutch armature 28 may thus be accelerated to match the rotational speed of the clutch rotor 26. The clutch armature 28 may be disposed adjacent to the clutch rotor 26 along the longitudinal axis 26. The clutch armature 28 may have a first face 46 that is configured to face the second face 44 of the clutch rotor 26 and may include a frictional material. The clutch armature 28 may have a second face 48 that is configured to face the supercharger 12. The second face 48 can oppose the first face 46.

The clutch armature 28 may be connected to the drive shaft 18 of the supercharger 12 through a spline and bolt. The clutch armature 28 may contain speed sensitive components in one example. The rotational speed of the clutch armature 28 may be less than the rotational speed of the first and second shaft portions 22A and 22B when the clutch assembly 10 is disengaged. Accordingly, the clutch armature 28 may be configured to coast down to a stop when the clutch assembly 10 is disengaged, rather than always having to maintain the same rotational speed of the pulley 24.

The clutch armature 28 may not be connected to the second shaft portion 22B and or the pulley 24 in one configuration. Instead, the clutch armature 28 may be separated from the pulley 24 in accordance with one example. The clutch armature 20 may be connected to the drive shaft 18 of the supercharger 12. The rotational speed of the clutch armature 28 may be substantially the same as the rotational speed of the first and second shaft portions 22A and 22B when the clutch assembly 10 is engaged. Because it may be more difficult to keep the clutch armature 28 stable at higher speeds because of the inclusion of speed sensitive material, the clutch armature 28 may not be connected to the second shaft portion 22B and or the pulley 24. The clutch armature 28 may be separated from the pulley 24, and therefore, the clutch armature 28 may not influence the size and/or range of the pulley 24. By separating the clutch armature 28 from the pulley 24, the size of the clutch housing 20 in the area around the pulley 24 may be decreased. Furthermore, the size and configuration of the pulley 24 may not depend on the size and/or torque capacity of the armature 28.

The clutch coil 30 can include a source of magnetic flux. An electrical current and/or voltage may be applied to the clutch coil 30 to generate a magnetic field in the vicinity of the clutch coil 30 and produce magnetic lines of flux. The intensity of the magnetic field may be proportional to the level of the current provided. This flux may then be transferred through the small working air gap between the clutch coil 30 and the clutch rotor 26. The clutch rotor 26 may thus become magnetized and set up a magnetic loop that attracts the clutch armature 28. The clutch armature 28 may then be pulled against the clutch rotor 26 and a frictional force may be applied at contact and the load on the clutch armature 28 may be accelerated to match the speed of the clutch rotor 26. When current and/or voltage is removed from the clutch assembly 10, the clutch armature 28 may be free to turn with the drive shaft 18 of the supercharger 12.

The clutch coil 30 may not be surrounded by the pulley 24. Instead, the clutch coil 30 may be mounted in the clutch rotor 26 and may be located closer to the housing 16 of the supercharger 12. The clutch coil 30 may be disposed between the clutch rotor 26 and the clutch housing 20 in a direction along the longitudinal axis 36. The clutch coil 30 may be spaced along the longitudinal axis 36 from the pulley 24. The clutch coil 30 may be separated from the pulley 24, and therefore, the clutch coil 30 may not influence the size and/or range of the pulley 24. By separating the clutch coil 30 from the pulley 24, the size of the clutch housing 20 in the area around the pulley 24 may be decreased. Furthermore, the size and configuration of the pulley 24 may not depend on the size and/or torque capacity of the clutch coil 30.

In one configuration, the clutch coil 30 may be controlled by an electronic control unit (ECU) not shown that provides an electrical signal to the clutch coil 30 via wires 52. The ECU may process input, such as for example, but not limited to, sensor readings corresponding to vehicle parameters and process the input according to log rules to determine the appropriate electrical signal to provide to the clutch coil 30. The ECU may comprise a microprocessor having sufficient memory to store the logic rules (e.g., in the form of a computer program) for controlling operation of the clutch assembly 10.

A supercharger 12 including the clutch assembly 10 in accordance to one example may further include a step-up gear 50 connected to the drive shaft 18 of the supercharger 12. Accordingly, at least one of the rotors 14 of the supercharger 12 may utilize an input drive configuration including for example the drive shaft 18 and the step up gear 50 by means of which the supercharger 12 may receive input drive torque. A supercharger 12 in accordance with one example of the present disclosure may comprise the clutch assembly 10, pair of rotors 14, housing 16 that houses the pair of rotors 14, drive shaft 18 configured to drive rotation of the pair of rotors 14 and step-up gear 50 connected to the drive shaft 18.

In some examples, engagement of the clutch assembly 10 can cause audible noise or clutch chatter. As identified above, the coupling assembly 62 couples the first shaft portion 22A and the second shaft portion 22B. Torque can be transmitted from the first shaft portion 22A to the second shaft portion 22B through the coupling assembly 62. The coupling assembly 62 of the present disclosure provides torsional and axial damping and can further account for misalignment between the first input shaft 22A and the second input shaft 22B. The coupling assembly 62 can reduce noise and clutch chatter caused when the clutch assembly 10 is engaged. In this regard, the coupling assembly 62 can provide a damping feature to the clutch assembly 10.

With additional reference now to FIGS. 2-10, the coupling assembly 62 constructed in accordance to one example of the present disclosure will be described in greater detail. The coupling assembly 62 can generally include a first hub 70, a first coupling 72, a center hub 74, a second coupling 76 and a second hub 78. In the example shown, the first and second hubs 70 and 78 are constructed similarly and the first and second couplings 72 and 76 are constructed similarly.

Figure 3:
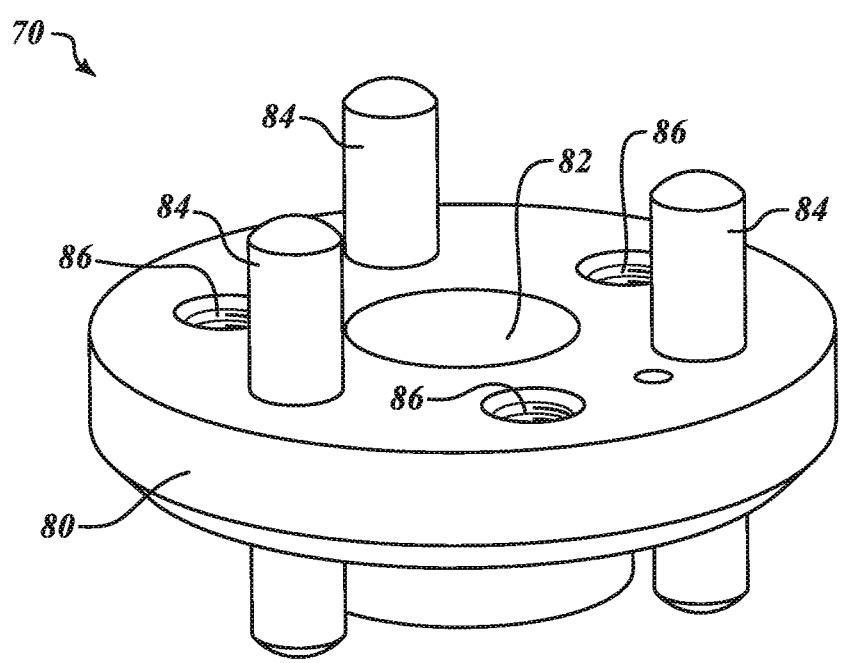
FIG. 3 is a front perspective view of a first hub of the coupling assembly of FIG. 2.
Figure 4:
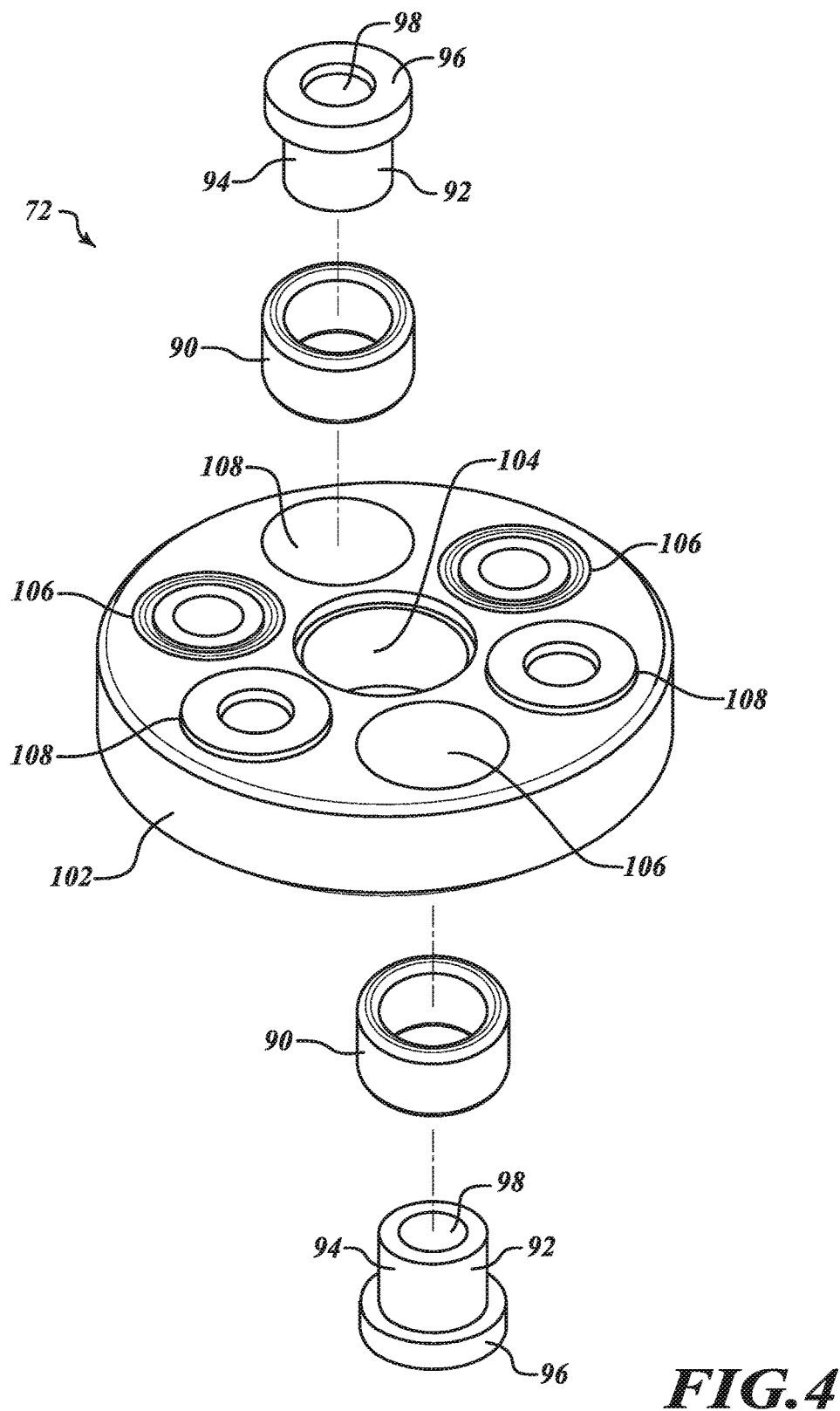
FIG. 4 is an exploded perspective view of a first coupling of the coupling assembly of FIG. 2.

With particular reference now to FIGS. 3 and 4, the first hub 70 will be described. The first hub 70 generally includes a first hub body 80 that defines a central bore 82. A first plurality of pins 84 extend from the first hub body 80. A plurality of threaded apertures 86 are defined through the first hub body 80. In the example shown the pins and threaded apertures 84 and 86, respectively are alternately arranged on the first hub 70. The first hub 70 can be formed of steel. The plurality of threaded apertures 86 can be used as a gripping feature for a removal tool when dislocating the first hub 70 from a remainder of the coupling assembly 62. A bushing 90 (FIG. 9) can be mounted (not specifically shown in FIG. 3) around each of the pins 84. The bushing 90 can be formed of elastomeric material such as ethylene propylene diene monomer (EPDM) rubber. The bushing 90 can be a synthetic elastomer (elastic polymer). The bushing 90 can be molded or poured as an amorphous liquid. The bushing 90 can have an inner diameter of about 7 mm, an outer diameter of about 11 mm and a height of about 9 mm. Other dimensions are contemplated. In one example, a sleeve 92 (FIG. 4) can be disposed between the pins 84 and the bushings 90. Each sleeve 90 can include a central body portion 94 and a flange 96. A central passage 98 can be defined through the central body portion 94. Each sleeve 90 can be formed of rigid material such as, but not limited to, steel, polyether ether ketone (PEEK) or glass-filled molded nylon. In the particular example shown, the pins 84 can be received by the passages 98. The bushings 90 can be mounted around the body 94 of each sleeve 92.

With continued reference to FIG. 4, the first coupling 72 will be further described. The first coupling 72 generally includes a coupling body 102 that defines a central bore 104. A first plurality of bores 106 are formed through the coupling body 102 and a second plurality of bores 108 are formed through the coupling body 102. The first and second bores 106 and 108 are alternately arranged on the coupling body 102. As will become appreciated herein, the first plurality of bores 106 are configured to receive the first plurality of pins 84 on the first hub 70. The first coupling 72 can be formed of any suitable lightweight durable material such as, but not limited to, PEEK or glass-filled molded nylon.

Figure 5:
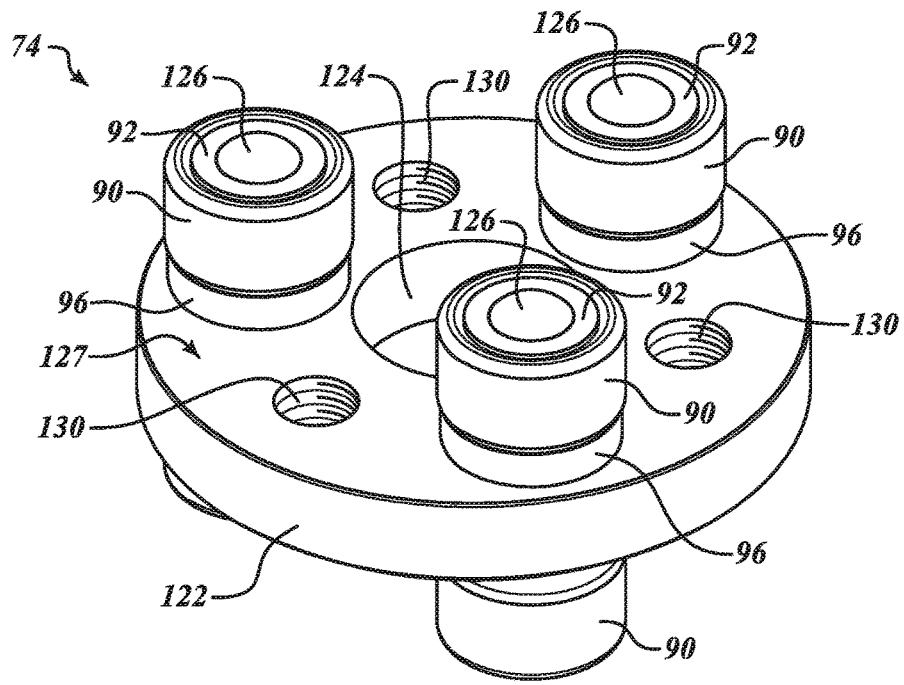
FIG. 5 is a front perspective view of a center hub of the coupling assembly of FIG. 2 and shown with elastomeric bushings and rigid sleeves assembled onto respective pins of the center hub.
Figure 6:
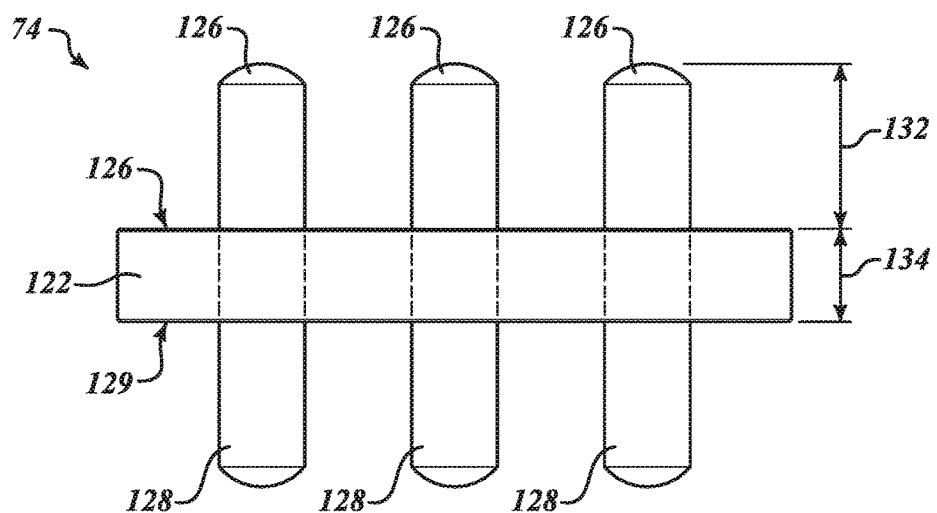
FIG. 6 is a side perspective view of the center hub of FIG. 5 and shown with the rigid sleeves and elastomeric bushings removed.

With particular reference now to FIGS. 5 and 6, the center hub 74 will be described. The center hub 74 generally includes a center hub body 122 that defines a central bore 124. A first plurality of pins 126 extend from a first face 127 of the center hub 74. The first plurality of pins 126 can be received by the sleeves 92. The bushings 90 are mounted around the bodies 94 of the respective sleeves 92. The resulting pins 126, sleeves 92 and bushings 90 can be received by the first plurality of bores 106 on the first coupling 72.

Figure 7:
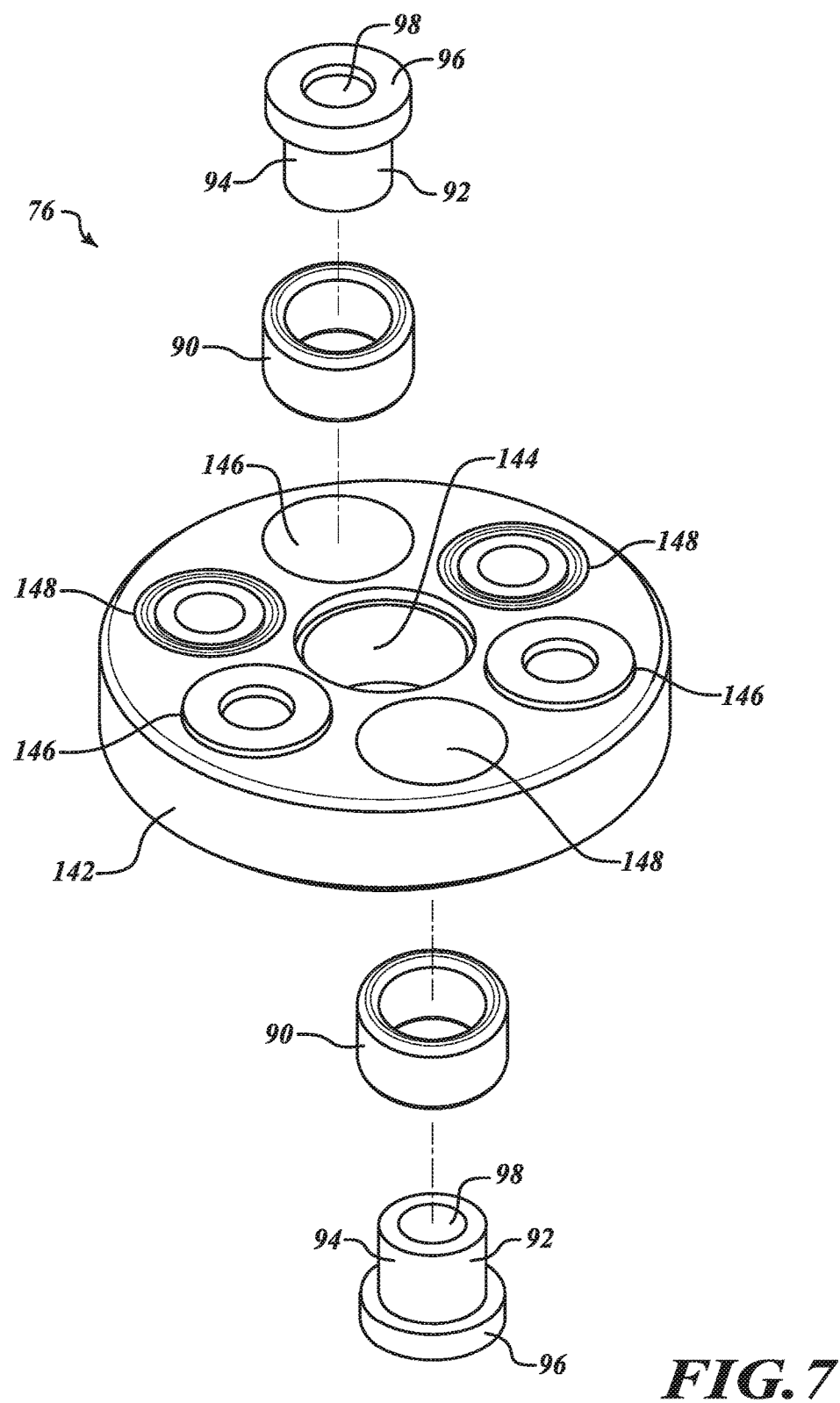
FIG. 7 is an exploded perspective view of a second coupling of the coupling assembly of FIG. 2.
Figure 10:
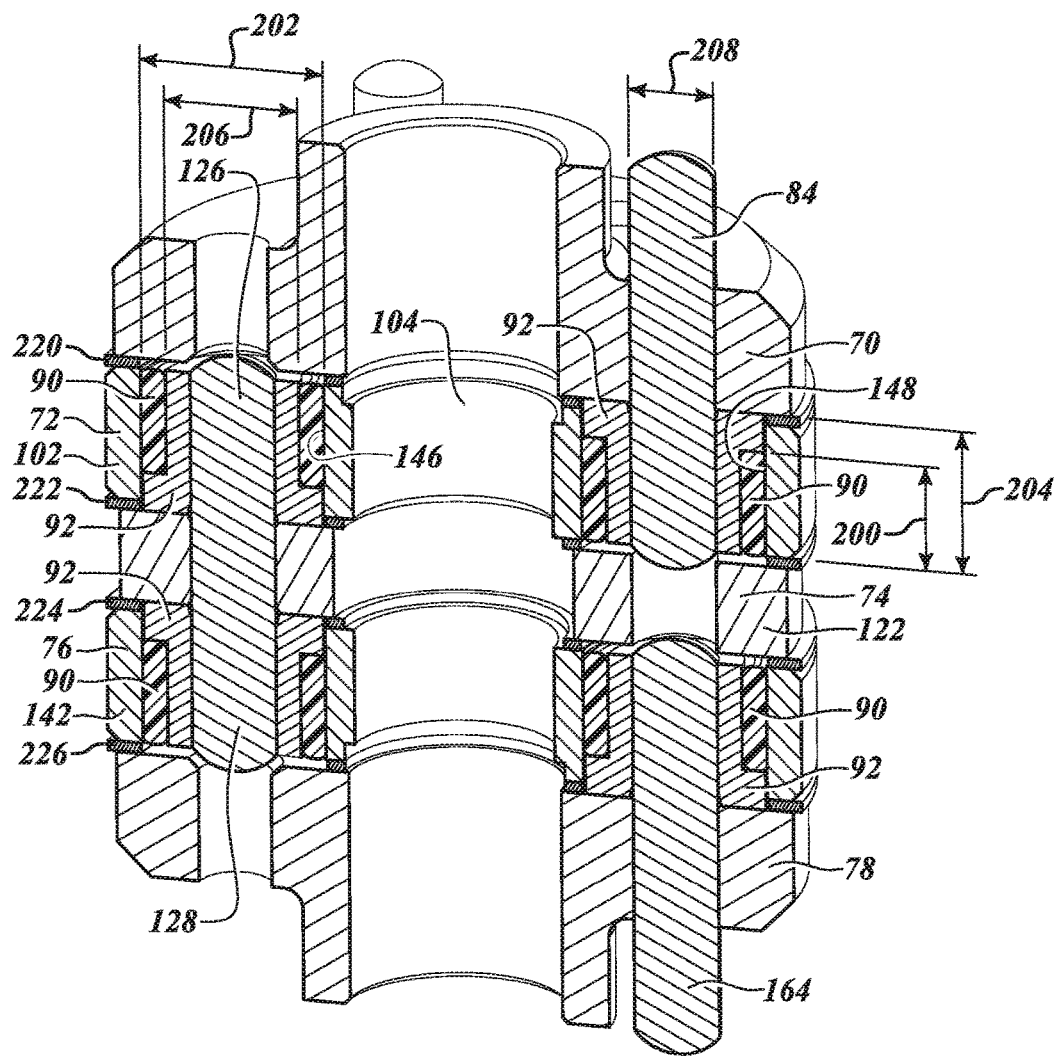
FIG. 10 is a cross-sectional view taken along lines 10-10 of the coupling assembly of FIG. 2.

A second plurality of pins 128 extend from a second face 129 of the center hub 74. It will be appreciated that the second plurality of pins 128 are formed coaxially relative to the first plurality of pins 126. In this regard, the first and second plurality of pins 126 and 128 may comprise unitary and continuous pins (FIG. 10). A plurality of threaded apertures 130 are defined through the center hub body 122. In the example shown, the pins 126, 128 and threaded apertures 130 respectively are alternately arranged on the center hub 74. The center hub 74 can be formed of steel. The second plurality of pins 128 can be received by a respective sleeve 92. The bushings 90 are mounted around the bodies 94 of the respective sleeves 92. The resulting pins 128, sleeves 92 and bushings 90 can be received by the first plurality of bores 146 (FIG. 7). In one configuration, the first and second plurality of pins 126 and 128 can have a height 132 (FIG. 6) between 7 mm and 9 mm. The central hub body 122 can have a thickness 134 of between 5 mm and 6 mm. In one example, the thickness 134 is 5.34 mm.

Turning now to FIG. 7, the second coupling 76 will be further described. Again, the second coupling 76 may be constructed similarly or equivalent to the first coupling 72. The second coupling 76 generally includes a coupling body 142 that defines a central bore 144. The first plurality of bores 146 are formed through the coupling body 142 and a second plurality of bores 148 are formed through the coupling body 142. The first and second bores 146 and 148 are alternately arranged on the coupling body 142.

As will become appreciated herein, the first plurality of bores 146 are configured to receive the second plurality of pins 128 on the center hub 122. The second plurality of pins 128 can be received by a respective sleeve 92 (FIG. 7). The bushings 90 are mounted around the bodies 94 of the respective sleeves 92. The resulting pins 128, sleeves 92 and bushings 90 can be received by the first plurality of bores 146. The second coupling 76 can be formed of any suitable lightweight durable material such as, but not limited to, PEEK or glass-filled molded nylon.

Figure 8:
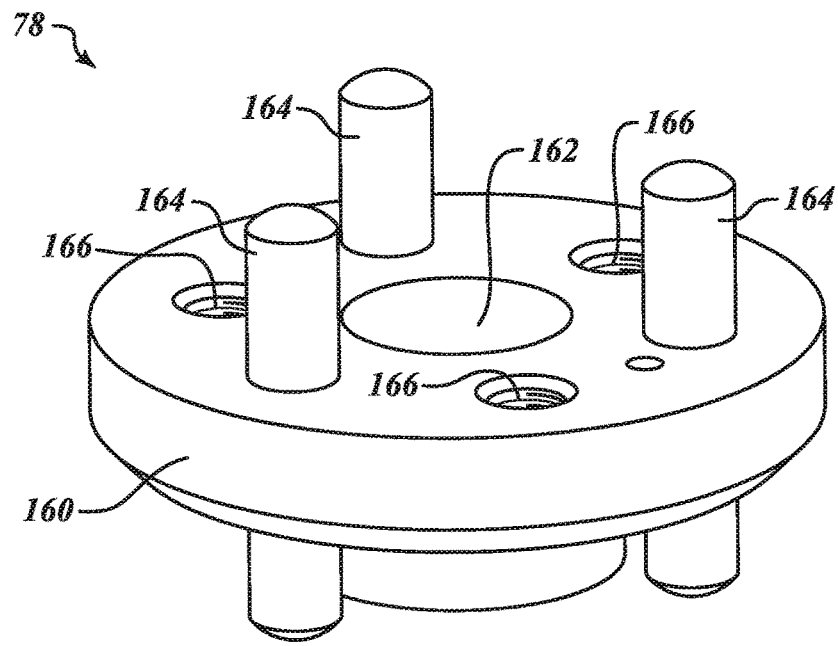
FIG. 8 is a front perspective view of a second hub of the coupling assembly of FIG. 2.
Figure 9:
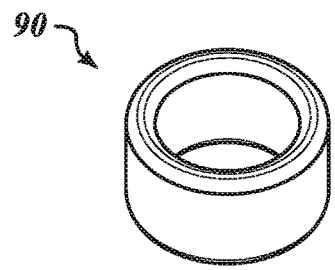
FIG. 9 is a top perspective view of an elastomeric bushing constructed in accordance to one example of the present teachings.

With particular reference now to FIG. 8, the second hub 78 will be described. The second hub 78 generally includes a second hub body 160 that defines a central bore 162. A plurality of pins 164 extend from the second hub body 160. A plurality of threaded apertures 166 are defined through the second hub body 160. In the example shown, the pins and threaded apertures 164 and 166 respectively are alternately arranged on the second hub 78. The second hub 78 can be formed of steel. The pins 164 can be received by the second plurality of bores 148 in the second coupling 76. Specifically, the pins 164 can be received by the passages 98 of the sleeve 92. The bushings 90 can be mounted around the body 94 of each sleeve 92. In this regard, the resulting pins 164, sleeves 92 and bushings 90 can be received by the second plurality of bores 148 (FIG. 7). The plurality of threaded apertures 166 can be used as a gripping feature for a removal tool when dislocating the second hub 78 from a remainder of the coupling assembly 62.

With reference now to FIG. 10, a cross-section taken through the first coupling 72 is shown. Exemplary dimensions of the first coupling 72 can include a depth 200 of the body 94 of the sleeve 92. The depth 200 can be 7.75 mm. The bores 106 and 108 can have a diameter 202 of 12 mm. A height 204 of the first coupling 72 can be 10 mm. A radial thickness 206 of the sleeves 92 can be 12.0 mm. A diameter 208 of the passage 98 of the sleeves 92 can be 7.94 mm. It will be appreciated that these dimensions are merely exemplary. As shown in FIG. 10, a first washer plate 220 can be disposed between the first hub 70 and the first coupling 72. A second washer plate 222 can be disposed between the first coupling 72 and the center hub 74. A third washer plate 224 can be disposed between the center hub 74 and the second coupling 76. A fourth washer plate 226 can be disposed between the second coupling 76 and the second hub 78. The washer plates 220, 222, 224 and 226 can protect adjacent hubs and couplings from rubbing against each other during torsional damping.

During operation, the coupling assembly 62 provides dampening (torsional and axial) between the first shaft portion 22A and the second shaft portion 22B. In this regard, the bushings 90 provide dampening between respective pin and counterbore interfaces for adjacent components. The bushings 90 mounted around the pins 84 provide parallel springs for the first hub 70. The bushings 90 mounted around the pins 164 provide parallel springs for the second hub 78. The bushings 90 provided on the pins 126 and 128 provide series springs for the center hub 74. In this regard, the coupling assembly 62 provides both parallel and series rubber elements to provide misalignment degree of freedom, torsional rate reduction and torsional and axial dampening.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A supercharger comprising:
   a first shaft portion connected to a pulley;
   a coupling assembly that couples the first shaft portion to a second shaft portion, wherein the first and second shaft portions are configured to rotate around a common longitudinal axis, the coupling assembly configured to provide torsional damping between the first and second shaft portions, wherein the coupling assembly further comprises:
      a first hub having a plurality of first hub pins extending therefrom, the first hub mounted for concurrent rotation with the first shaft portion;
      a second hub mounted for concurrent rotation with the second shaft portion;
      a first coupling disposed intermediate the first and second hubs, the first coupling defining a plurality of first coupling bores that receive the first hub pins; and
      a first elastomeric bushing mounted around one of the first hub pins and received by one of the first coupling bores, the first elastomeric bushing providing dampening between the first hub and the first coupling;
   a clutch rotor mounted to the second shaft portion, wherein the clutch rotor rotates around the longitudinal axis; and
   a clutch armature mounted to a drive shaft and unconnected to the first and second shaft portions, the clutch armature configured to rotate around the longitudinal axis, wherein the clutch rotor and clutch armature selectively cooperate in an engaged position and a disengaged position, wherein in the engaged position the clutch rotor and the clutch armature rotate together.

2. The supercharger of claim 1, further comprising:
   a clutch coil spaced along the longitudinal axis from the pulley wherein the clutch rotor is magnetized by the clutch coil.

3. The supercharger of claim 2, further comprising a clutch housing, wherein the clutch coil is mounted in the clutch rotor and is disposed between the clutch housing and the clutch rotor in a direction along the longitudinal axis.

4. The supercharger of claim 1, further comprising a plurality of first elastomeric bushings, wherein a first elastomeric bushing is mounted around each of the first hub pins.

5. The supercharger of claim 1 wherein the second hub includes a plurality of second hub pins extending therefrom.

6. The supercharger of claim 5, further comprising a plurality of second elastomeric bushings, wherein a second elastomeric bushing is mounted around each of the second hub pins.

7. The supercharger of claim 6, further comprising:
   a second coupling disposed intermediate the first and second hubs, the second coupling defining a plurality of second coupling bores that receive the second hub pins.

8. The supercharger of claim 7, further comprising:
   a center hub having a plurality of first center hub pins and a plurality of second center hub pins extending therefrom, wherein each first center hub pin is arranged coaxially to a corresponding second center hub pin.

9. The supercharger of claim 8 wherein the first center hub pins extend oppositely from the center hub relative to the second center hub pins.

10. The supercharger of claim 8, further comprising a plurality of third elastomeric bushings, wherein a third elastomeric bushing is mounted around each of the first center hub pins and the second center hub pins.

11. The supercharger of claim 10 wherein the second coupling defines a plurality of third coupling bores that receive the second center hub pins.

12. The supercharger of claim 1, further comprising a plurality of sleeves disposed between corresponding plurality of first hub pins and first elastomeric bushings.

13. The supercharger of claim 12 wherein each sleeve of the plurality of sleeves comprises a central body portion and a flange, wherein the central body portion defines a central passage configured to receive a corresponding first hub pin of the plurality of first hub pins.

14. A supercharger comprising:
   a first shaft portion connected to a pulley;
   a coupling assembly that couples the first shaft portion to a second shaft portion, wherein the first and second shaft portions are configured to rotate around a common longitudinal axis, the coupling assembly configured to provide torsional damping between the first and second shaft portions, wherein the coupling assembly comprises:
      a first hub having a plurality of first hub pins extending therefrom, the first hub mounted for concurrent rotation with the first shaft portion;
      a second hub mounted for concurrent rotation with the second shaft portion;
      a first coupling disposed intermediate the first and second hubs, the first coupling defining a plurality of first coupling bores that receive the first hub pins; and
      a first elastomeric bushing mounted around one of the first hub pins and received by one of the first coupling bores, the first elastomeric bushing providing dampening between the first hub and the first coupling;

a pair of rotors each having a plurality of meshed lobes;
a drive shaft that drives the pair of rotors; and
a clutch assembly that selectively couples the second shaft portion and the drive shaft.

15. The supercharger of claim 14 wherein the clutch assembly further comprises:
    a clutch rotor mounted to the second shaft portion, wherein the clutch rotor rotates around the longitudinal axis; and
    a clutch armature mounted to the drive shaft and unconnected to the first and second shaft portions, the clutch armature configured to rotate around the longitudinal axis, wherein the clutch rotor and clutch armature selectively cooperate in an engaged position and a disengaged position, wherein in the engaged position the clutch rotor and the clutch armature rotate together.

16. The supercharger of claim 15, further comprising:
    a clutch coil spaced along the longitudinal axis from the pulley wherein the clutch rotor is magnetized by the clutch coil.

17. The supercharger of claim 16, further comprising a clutch housing, wherein the clutch coil is mounted in the clutch rotor and is disposed between the clutch housing and the clutch rotor in a direction along the longitudinal axis.

18. A supercharger comprising:
    a first shaft portion connected to a pulley;
    a coupling assembly that couples the first shaft portion to a second shaft portion, wherein the first and second shaft portions are configured to rotate around a longitudinal axis, the coupling assembly configured to provide torsional damping between the first and second shaft portions, the coupling assembly comprising:
        a first hub having a plurality of first hub pins extending therefrom, the first hub mounted for concurrent rotation with the input shaft;
        a second hub having a plurality of second hub pins extending therefrom, the second hub mounted for concurrent rotation with the rotor shaft;
        a first coupling disposed intermediate the first and second hubs, the first coupling defining a plurality of first coupling bores that receive the first hub pins;
        a second coupling disposed intermediate the first and second hubs, the second coupling defining a plurality of second coupling bores that receive the second hub pins;
        a center hub having a plurality of first center hub pins and a plurality of second center hub pins extending therefrom, the first center hub pins being coaxial with the second center hub pins, wherein each first center hub pin is received in corresponding first coupling bores of the first coupling and each second center hub pin is received in corresponding second coupling bores of the second coupling;
        a plurality of elastomeric bushings;
        a plurality of sleeves, wherein the plurality of elastomeric bushings are arranged around the plurality of sleeves and wherein the plurality of sleeves each define a central body portion that defines a central passage that receives a first hub pin; and
        wherein the corresponding first hub pins, sleeves and elastomeric bushings are received by the corresponding first coupling bores, the first elastomeric bushing providing dampening between the first hub and the first coupling;
    a pair of rotors each having a plurality of meshed lobes;
    a drive shaft that drives the pair of rotors; and
    a clutch assembly that selectively couples the second shaft portion and the drive shaft.

\* \* \* \* \*